US011758397B2

(12) United States Patent
Kweon et al.

(10) Patent No.: US 11,758,397 B2
(45) Date of Patent: Sep. 12, 2023

(54) METHOD FOR REQUESTING AUTHENTICATION BETWEEN TERMINAL AND 3RD PARTY SERVER IN WIRELESS COMMUNICATION SYSTEM, TERMINAL THEREFOR, AND NETWORK SLICE INSTANCE MANAGEMENT DEVICE

(71) Applicant: Samsung Electronics Co., Ltd., Suwon-si (KR)

(72) Inventors: Kisuk Kweon, Suwon-si (KR); Joohyung Lee, Gwacheon-si (KR); Jicheol Lee, Suwon-si (KR); Daegyun Kim, Seongnam-si (KR); Sangjun Moon, Seoul (KR); Jungshin Park, Seoul (KR); Beomsik Bae, Suwon-si (KR); Jinsung Lee, Suwon-si (KR); Hyungho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/127,123

(22) Filed: Dec. 18, 2020

(65) Prior Publication Data
US 2021/0105623 A1 Apr. 8, 2021

Related U.S. Application Data

(63) Continuation of application No. 16/327,205, filed as application No. PCT/KR2017/009102 on Aug. 21, 2017, now abandoned.

(30) Foreign Application Priority Data

Dec. 5, 2016 (KR) .......................... 10-2016-0164157

(51) Int. Cl.
*H04W 12/06* (2021.01)
*H04L 9/32* (2006.01)
(Continued)

(52) U.S. Cl.
CPC ............... *H04W 12/06* (2013.01); *H04L 9/32* (2013.01); *H04L 12/14* (2013.01);
(Continued)

(58) Field of Classification Search
CPC .......... H04W 12/06; H04L 9/32; H04L 12/14; H04L 12/1407; H04L 9/321; H04L 9/3213
See application file for complete search history.

(56) References Cited

U.S. PATENT DOCUMENTS

2012/0263298 A1 10/2012 Suh et al.
2013/0007232 A1 1/2013 Wang et al.
(Continued)

FOREIGN PATENT DOCUMENTS

WO 2011/081311 A2 7/2011
WO 2012/134218 A2 10/2012

OTHER PUBLICATIONS

Nokia et al., S2-163507, Merged Proposal for Network Slice Selection, 3GPP TSG SA WG2 #116, Jul. 5, 2016.
(Continued)

*Primary Examiner* — Chae S Lee
(74) *Attorney, Agent, or Firm* — Jefferson IP Law, LLP

(57) ABSTRACT

The present invention relates to a communication system and method for merging, with IoT technology, a 5G communication system for supporting a data transmission rate higher than that of a 4G system. The present invention provides a system and method by which a user equipment (UE) transmits, to an access and mobility management function (AMF), a first message including information
(Continued)

related to a network slice in a first authentication, and receives, from the AMF, a third message including a result of a second authentication, wherein whether to require the second authentication is determined by the AMF based on the information and subscription information, and wherein the second authentication between the UE and a server is triggered based on the determination.

15 Claims, 7 Drawing Sheets

Related U.S. Application Data

(60) Provisional application No. 62/377,866, filed on Aug. 22, 2016.

(51) Int. Cl.
| | | |
|---|---|---|
| *H04L 12/14* | (2006.01) | |
| *H04M 15/00* | (2006.01) | |
| *H04W 48/18* | (2009.01) | |
| *H04W 80/10* | (2009.01) | |

(52) U.S. Cl.
CPC .... *H04L 12/1407* (2013.01); *H04M 15/8228* (2013.01); *H04W 48/18* (2013.01); *H04W 80/10* (2013.01)

(56) References Cited

U.S. PATENT DOCUMENTS

| | | | |
|---|---|---|---|
| 2013/0343280 A1 | 12/2013 | Lee et al. | |
| 2016/0352734 A1* | 12/2016 | Senarath | H04L 63/10 |
| 2017/0142591 A1* | 5/2017 | Vrzic | H04W 16/02 |
| 2017/0339688 A1 | 11/2017 | Singh et al. | |
| 2019/0149329 A1 | 5/2019 | Wu et al. | |
| 2019/0223093 A1* | 7/2019 | Watfa | H04W 48/18 |
| 2021/0058783 A1* | 2/2021 | Lei | H04W 48/08 |

OTHER PUBLICATIONS

Samsung, S2-162524, Update of solution for support of multiple connections to multiple network slices to efficiently support multiple 3rd parties, 3GPP TSG SA WG2 #115, May 17, 2016.

Korean Office Action dated Oct. 27, 2022, issued in Korean Patent Application No. 10-2016-0164157.

* cited by examiner

METHOD FOR REQUESTING AUTHENTICATION BETWEEN TERMINAL AND 3RD PARTY SERVER IN WIRELESS COMMUNICATION SYSTEM, TERMINAL THEREFOR, AND NETWORK SLICE INSTANCE MANAGEMENT DEVICE

CROSS-REFERENCE TO RELATED APPLICATION(S)

This application is a continuation application of prior application Ser. No. 16/327,205, filed on Feb. 21, 2019, which was the National Stage of International application PCT/KR2017/009102, filed on Aug. 21, 2017, which claimed priority under 35 U.S.C § 119(e) of a U.S. Provisional application Ser. No. 62/377,866, filed on Aug. 22, 2016, in the U.S. Patent and Trademark Office, and under 35 U.S.C. § 119(a) of a Korean patent application number 10-2016-0164157, filed on Dec. 5, 2016, in the Korean Intellectual Property Office, the entire disclosure of each of which is incorporated by reference herein in its entirety.

TECHNICAL FIELD

The present invention relates to a terminal, a method for authentication request between the terminal and a third party server, and a terminal and network slice management device; in particular, the present invention relates to a method for the network slice instance management device to assign a network for use in authentication between the terminal and the third party server.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Recent mobile communication systems employ various new technologies to meet requirements for rapidly increasing data traffic and diverse services. In order to meet such requirements, discussions are underway on 5G standards for next generation mobile communication systems capable of meeting such requirements. The 5G system is also referred to as a New Radio access technology (NR) system. The NR system aims to provide data services at a data rate of a few Gbps with an ultra-high bandwidth broader than the 100 MHz of the legacy LTE and LTE-A systems.

For the 5G communication system, a next generation (NG) core network is newly defined.

In the NG core network, a new concept of "network function" is introduced for virtualizing legacy network entities (NEs). Furthermore, the functionality of the mobility management entity (MME) is divided into a mobility management function and a session management function, and terminal mobility management varies with terminal usage type.

Meanwhile, it is necessary for the 5G communication system to support various types of terminals. For example, the 5G communication system needs designing to support enhanced mobile broadband (eMBB), ultra-reliable low-latency communications (URLLC), and massive machine type communications (mMTC) services. In this case, the requirements for the NG core network to serve the terminals may vary with the type of the service to be provided to the terminal.

For example, an eMBB communication service may require a high data rate while a URLLC communication may require a high reliability and low latency.

In this respect, discussions are underway on a network slicing technology for supporting various services and terminals.

The network slicing technology virtualizes a physical network to generate multiple logical networks. Here, network slice instances (NSIs), as the instances generated based on respective network slices, may have different service characteristics. That is, the NSIs may support different network functions suitable for respective service characteristics.

That is, the 5G communication system is capable of supporting 5G communication services efficiently by assigning to a terminal an NSI suitable for the service characteristics required by the terminal.

DISCLOSURE OF INVENTION

Technical Problem

In the case where the 5G communication system supports the network slicing technology, a network carrier may rent out sliced networks to mobile virtual network operators (MVNOs) or third party service (or content) providers to create extra profits. In this case, the NSIs are functionally isolated from each other so as to operate as independent networks.

The third party service providers may provide the users subscribed to their services with improved quality of service (QoS) using the tenanted network slices. In this case, the third party service providers need to authenticate the terminals of the users subscribed to their services among the users attempting access to their services.

The present invention aims to provide a method and device that is capable of authenticating a terminal in order for the user of the terminal to use an NSI created based on the network slice tenanted by a third party service provider.

The objects of the present invention are not limited to the aforesaid, and other objects not described herein will be clearly understood by those skilled in the art from the descriptions below.

Solution to Problem

In accordance with an aspect of the present invention, a method for a terminal to request to a third party server for authentication includes transmitting a service request message including a tenant identifier (ID) and a slice type provided by an application associated with the third party server to a common control plane network function serving unit, receiving, if a limited data session (limited packet data unit session) for authentication between the terminal and the third party server is established by a network slice instance management device (network slice instance unit) selected by the common control plane network function serving unit based on the service request message, a service response message including information on a limited data session from the network slice instance management device, and transmitting an authentication request message requesting for authentication on the terminal to the third party server through the limited data session based on the service response message.

In accordance with another aspect of the present invention, a method for a network slice instance management device (network slice instance unit) to establish a data session includes receiving a service request message from a terminal, establishing a limited data session (limited packet data unit session) for authentication between the terminal and a third party server based on the received service request message, and transmitting a service response message including information on the limited data session to the terminal to assign the limited data session between the terminal and the third party server.

In accordance with another aspect of the present invention, a terminal requesting to a third party server for authentication includes a communication unit configured to communicate with an external node, a storage unit configured to store a tenant identifier (ID) and a slice type, and a processor configured to control the communication unit to transmit a service request message including a tenant identifier (ID) and a slice type provided by an application associated with the third party server to a common control plane network function serving unit, receive, if a limited data session (limited packet data unit session) for authentication between the terminal and the third party server is established by a network slice instance management device (network slice instance unit) selected by the common control plane network function serving unit based on the service request message, a service response message including information on a limited data session from the network slice instance management device; and transmit an authentication request message requesting for authentication on the terminal to the third party server through the limited data session based on the service response message.

In accordance with still another aspect of the present invention, a network slice instance management device (network slice instance unit) for establishing a data session includes a communication unit configured to communicate with an external node and a controller configured to control the communication unit to receive a service request message from a terminal, establish a limited data session (limited packet data unit session) for authentication between the terminal and a third party server based on the received service request message, and transmit a service response message including information on the limited data session to the terminal to assign the limited data session between the terminal and the third party server.

Advantageous Effects of Invention

The authentication method for use of a network slice according to the present invention is advantageous in terms of simplifying the authentication procedure between a terminal and a third party server.

The present invention is advantageous in that only installing an application associated with a third party server on a terminal makes it possible to facilitate transmitting traffic of the installed application to the third party server.

The present invention is also advantageous in that the third party server is capable of authenticating a user of a terminal for use of a network slice according to a legacy user authentication scheme. This makes it possible to simplify wireless communication network deployment scenarios and expect a cost reduction effect.

The other effects may be explicitly or implicitly disclosed in the description of the embodiments of the present invention. That is, various effects expected from the present invention will become clear in the following description of the embodiments of the present invention.

MODE FOR THE INVENTION

Figure 1:
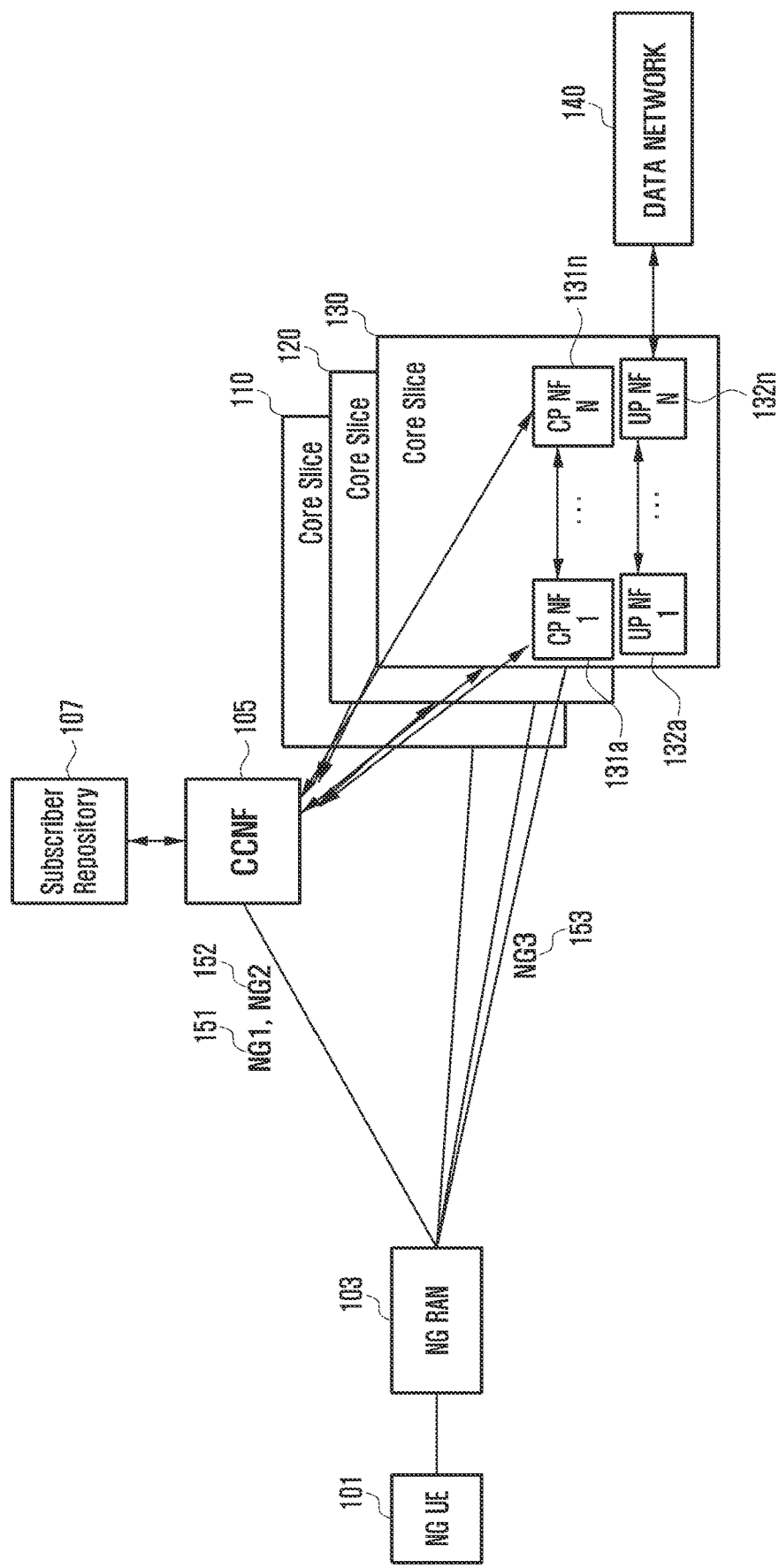
FIG. 1 is a diagram illustrating a 5G wireless communication system according to an embodiment of the present invention.

Exemplary embodiments of the present invention are described in detail with reference to the accompanying drawings. The same reference numbers are used throughout the drawings to refer to the same or like parts; detailed descriptions of well-known functions and structures incorporated herein may be omitted to avoid obscuring the subject matter of the present invention. Further, the following terms are defined in consideration of the functionality in the present invention and may vary according to the intention of a user or an operator, usage, etc. Therefore, the definition should be made on the basis of the overall content of the present specification.

As used herein, the singular forms "a", "an", and "the" are intended to include the plural forms as well, unless the context clearly indicates otherwise.

As used herein, ordinal terms such as "first," "second," etc. are used to describe various components; however, it is obvious that the components should not be defined by these terms. The terms are used only for distinguishing one component from another component. For example, a first component may be referred to as a second component and, likewise, a second component may also be referred to as a first component, without departing from the teaching of the inventive concept. Also, the expression "and/or" is taken as a specific invention of each and any combination of enumerated things.

The terminology used herein is for the purpose of describing particular embodiments only and is not intended to be limiting of the invention. As used herein, singular forms are intended to include the plural forms as well, unless the context clearly indicates otherwise. It will be understood that the terms "comprises" and/or "has" when used in this specification, specify the presence of a stated feature, number, step, operation, component, element, or a combination thereof, but they do not preclude the presence or addition of one or more other features, numbers, steps, operations, components, elements, or combinations thereof.

The phrases "associated with" and "associated therewith" as well as derivatives thereof may mean to include, be included within, interconnect with, contain, be contained within, connect to or with, couple to or with, be communicable with, cooperate with, interleave, juxtapose, be proximate to, be bound to or with, have, have a property of, or the like.

When it is described that a part is (functionally or communicably) "connected to" or "coupled to" another part, this may mean to include not only the case of "being directly connected to" but also the case of "being indirectly connected to" by interposing another device being interposed therebetween.

When it is described that a first part transmits data to a second part, this may mean to include not only the case of delivering the data from the first part to the second part directly but also the case of delivering the data from the first part to the second part via another part (e.g., third part). For example, if it is expressed that a terminal transmits data to a core network, this may mean to include a situation where the terminal transmits the data to the core network via a base station or an access point (AP).

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Before undertaking the detailed description of the present invention below, it may be advantageous to set forth definitions of certain words and phrases used throughout the specification. However, it should be noted that the words and phrases are not limited to the exemplary interpretations herein.

The term "base station" denotes an entity allocating resources to terminals for communications therewith and may be interchangeably referred to as BS, node B (NB), evolved node B (eNB), next generation radio access network (NG RAN), radio access unit, base station controller, and a node on a network.

The term "terminal (or communication terminal)" may denote an entity communicating with a base station or another terminal and may be interchangeably referred to as node, user equipment (UE), next generation UE (NG UE), mobile station (MS), mobile equipment (ME), and device.

The terminal may include at least one of a smart phone, a tablet personal computer (PC), a mobile phone, a video phone, an e-book reader, a desktop PC, a laptop PC, a netbook computer, a Personal Digital Assistant (PDA), a portable Multimedia Player (PMP), an MP3 player, a medical device, a camera, and a wearable device. The terminal may also include at least one of a television (TV), a Digital Video Disk (DVD) player, an audio player, a refrigerator, an air conditioner, a cleaner, an oven, a microwave oven, a washing machine, an air cleaner, a set-top box, a home automation control panel, a security control panel, a media box (for example, Samsung HomeSync™, Apple TV™, or Google TV™), a game console (e.g., Xbox™ and PlayStation™), an electronic dictionary, an electronic key, a camcorder, and an electronic frame. The terminal may also include at least one of a medical device (such as portable medical measuring devices (including a glucometer, a heart rate monitor, a blood pressure monitor, and a body temperature thermometer), a Magnetic Resonance Angiography (MRA) device, a Magnetic Resonance Imaging (MRI) device, a Computed Tomography (CT) device, a camcorder, and a microwave scanner), a navigation device, a Global Navigation Satellite System (GNSS), an Event Data Recorder (EDR), a Flight Data Recorder (FDR), an automotive infotainment device, marine electronic equipment (such as marine navigation system and gyro compass), aviation electronics (avionics), security equipment, an automotive head unit, an industrial or household robot, a drone, an Automated Teller Machine (ATM), a Point Of Sales (POS) terminal, and an Internet-of-Things (IoT) device (such as electric bulb, sensor, sprinkler system, fire alarm system, temperature controller, street lamp, toaster, fitness equipment, hot water tank, heater, and boiler).

The terminal may further include various types of multimedia systems having a communication function.

Although the embodiments of the present invention are directed to the 5G wireless communication system, the present invention is applicable to other communication systems having a similar technical background. It will be also understood by those skilled in the art that the present invention can be applied to other communication systems, with a slight modification, without departing from the spirit and scope of the present invention.

FIG. 1 is a diagram illustrating a 5G wireless communication system according to an embodiment of the present invention.

In FIG. 1, the NG UE 101 denotes a terminal being served by the 5G wireless communication system, and the NG RAN 103 denotes a base station performing wireless communication with the UE in the 5G wireless communication system. The common control plane network function (CCNF) 105 is connected with the NG RAN 103 to process control messages for management of the NG UE 101 and manages mobility of the NG UE 101. The CCNF 105 may have a network function set including network functions available in common for the NSIs created based on the network slices 110, 120, and 130 among the network control functions (control plane network functions).

For example, the common network functions may include a mobility management network function MM NF, an authentication/authorization NF, an NSI selector NF, and a non-access stratum routing NF (NAS routing NF). Among them, the NSI selector NF may be a network function for selecting the best NSI for providing the service requested by the UE 101. The NAS routing NF may be responsible for routing an NAS signal from the UE 101 to a proper NSI.

The subscriber repository 107 may receive subscriber information to authenticate the UE 101 and include subscription information for providing a QoS policy.

The NSIs created for use of the respective network slices 110, 120, and 130 may include respective control plane NFs (CP NFs) 131a to 131n and user plane NFs (UP NFs). The CP NF is responsible for session management to establish, modify, and release a session for a service. The UP NF may manage a service data transmission to the data network 140 via IP address assignment.

In FIG. 1, the UE 101 may connect to multiple NSIs. That is, there may be multiple reference points.

For example, the NG 1 interface 151 is an interface established between the UE 101 and the CP NF and may be similar in role to the interface for NAS signaling in the legacy LTE communication network. The NG 2 interface 152 is an interface established between the RAN 103 and the CP NF and may be similar in role to the interface for S1-MME signaling in the legacy LTE communication network. The NG 3 interface 153 is an interface established between the RAN 103 and the UP NF and may be similar in role to the S1-U bearer interface in the legacy LTE communication network.

In this case, the signaling over the NG 1 interface 151 and the NG 2 interface 152 may access the Per NSI CP NFs via the CCNF 105, and the NG 3 interface 153 may provide direct connections from the RAN 103 to per-NSI UP NFs.

In the following description, a device responsible for the CCNF is referred to as a common control function provision device (CCNF unit), a device responsible for function as a network slice instance management device (NSI), a device responsible for CP NF as a network session management device (CP NF unit), and a device responsible for UP NF as a network data management device (UP NF unit), for convenience of explanation.

Here, the term "device" may be a unit of software, hardware, firmware, or any combination thereof, for example, the term "module" may be interchangeably used with the terms "unit", "logic", "logical block", "component", or "circuit". At least part of the device may be implemented in the form of a program module with commands stored in a computer-readable storage medium. The device may also include an Application-Specific Integrated Circuit (ASIC) chip, Field-Programmable Gate Arrays (FPGAs), and a Programmable-Logic Device known or to be developed for certain operations.

It may be possible to integrate at least two devices into one device. In this case, the integrated devices may be implemented as hardware, software, or firmware modules as parts of one device. For example, the NSI management device (NSI unit) may include the network session management device (CP NF unit) and the network data management device (UP NF unit) implemented as software modules as parts of the NSI management device (NSI unit).

Figure 2:
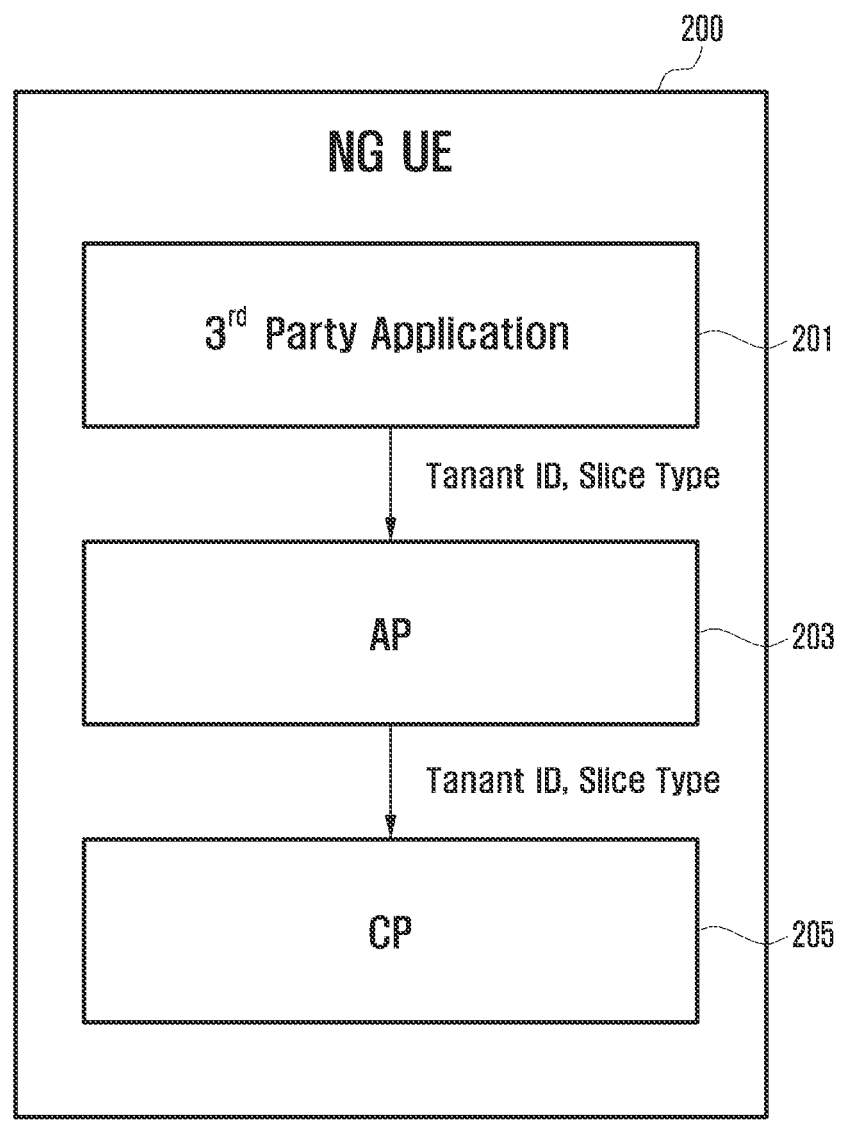
FIG. 2 is a block diagram illustrating a configuration of a terminal that requests to a third party server for authentication according to an embodiment of the present invention.

FIG. 2 is a block diagram illustrating a configuration of a terminal that requests to a third party server for authentication according to an embodiment of the present invention.

In FIG. 2, a third party application 201 associated with the third party server may be installed on the NG UE 200. The third party application 201 associated with the third party server may be installed for use of a network slice tenanted by a third party service provider operating the third party server.

The third party application 201 may be provided by the third party service provider or an application provider cooperating with one or more third party service providers. For example, if the third party server being operated by the third part service provider is a social network server (SNS) server, the application may be an application associated with the SNS server.

The third party application 201 may be installed on the UE 200 along with a tenant identifier (ID) for use in identifying the third party service provider providing the application and a slice type specifying service requirements. The slice type may include information on the usage or type of data, which indicates whether the data are multimedia data or IoT data by way of example.

In this case, if the third party application 201 is installed on the UE 200 along with the tenant ID and slice type, this means that the tenant ID and slice type are stored in the UE 200 in association with or in binding with the application upon detection of a predetermined event during, right after, or since the installation of the third party application 201.

If the third party application 201 is installed, the tenant ID and slice type may be sent to a communication processor (CP) 205 via an application processor (AP) 203, the tenant ID and slice type being transmitted to a communication network via control signaling.

In this case, the third party service provider may have per-operator tenant IDs and slice types, which are determined based on the public land mobile network identifiers (PLMN IDs) of the operators subscribed to by the UE and sent to the CP 205.

In the case where the third party application 201 is installed or executed on the UE 200 or generates an event triggering a third party service (e.g., event occurring when the user selects a wireless communication connection UI), the CP may transmit a service request message including the tenant ID and slice type to a CCNF unit.

Next, if the CCNF unit selects an NSI unit based on the tenant ID and slice type, the UE 200 may transmit traffic of the third party application 200 to the third party server through a data session established by the NSI unit.

As described above, the UE is capable of using the network slice tenanted by the third party service provider only with the operation of installing the application associated with the third party server. That is, the user only needs to install the application for the traffic of the installed application to be transmitted to the third party server through the network slice.

According to various embodiments, the tenant ID and slice type may be acquired from the third party server. For example, in the case where the application associated with the third party server is installed, the UE may request to the third party server for the tenant ID and slice type. If the third party server transmits the tenant ID and slice type in response to the request from the UE, the UE may use the network slice tenanted by the third party service provider based on the received tenant ID and the slice type.

Figure 3:
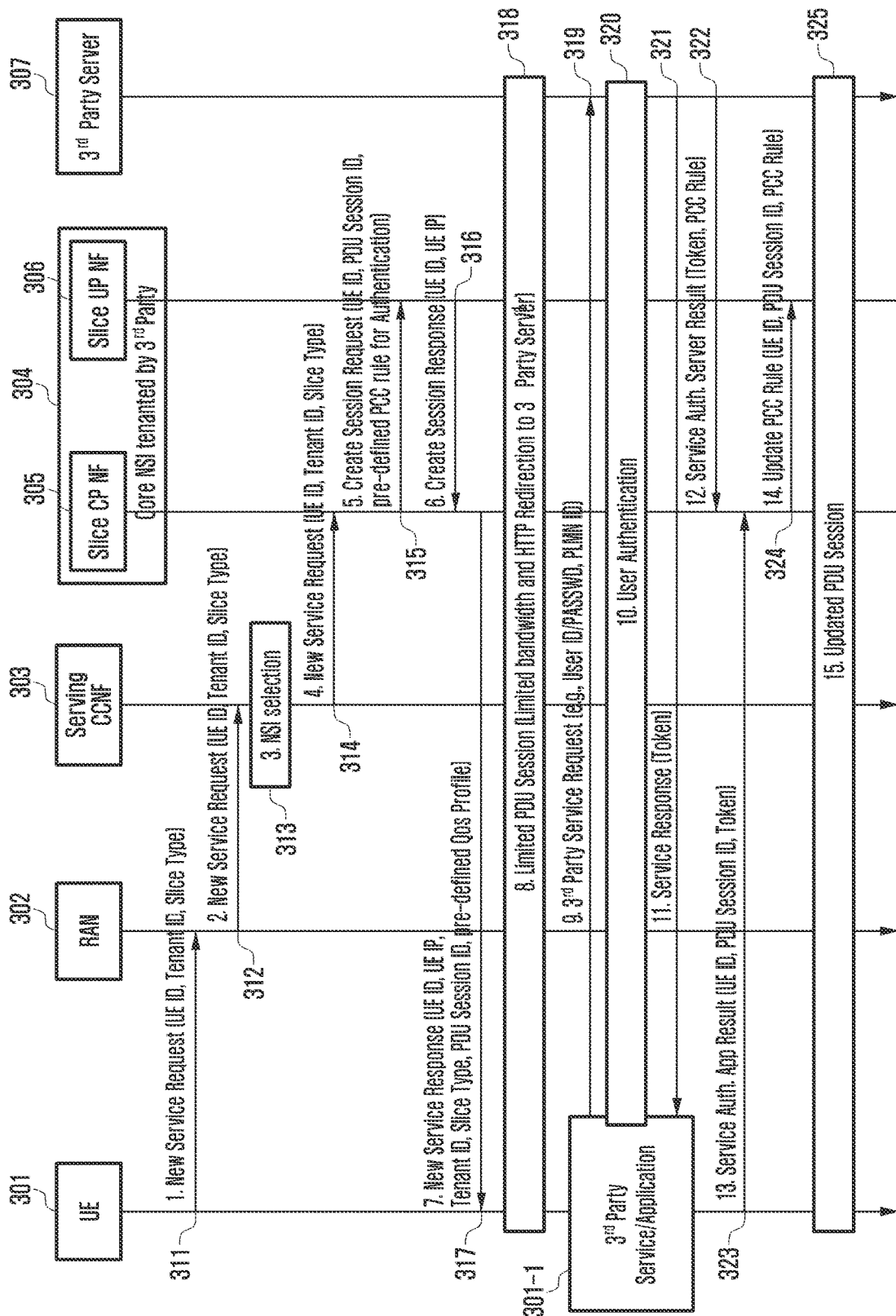
FIG. 3 is a signal flow diagram illustrating a procedure for a UE to request to a third party server for authentication for use of a network slice according to an embodiment of the present invention.

FIG. 3 is a signal flow diagram illustrating a procedure for a UE to request to a third party server for authentication for use of a network slice according to an embodiment of the present invention.

In FIG. 3, the wireless communication system may include a UE 301, a RAN 302, a CCNF unit (serving CCNF unit or CCNF serving unit) 303, an NSI unit (core NSI tenanted by 3$^{rd}$ party) 304, a CP NF unit (Slice CP NF unit), an UP NF unit (Slice UP NF unit), and a third party server 307. Here, the third party server 307 is a third party service-related server for providing the third party service or performing user authentication for providing the third party service.

In this case, the UE 301 may be in the state of being previously attached to the communication operator network. The UE 301 may also be in the state of being authenticated by the communication operation and assigned a UE ID. The UE 301 may also be in the state of having an application associated with the third party server 307 installed and the tenant ID and slice type along with the application.

At steps 311 and 312, the UE 301 may transmit a new service request message to the communication network 301. For example, if the application associated with the third party server is installed or executed or generates an event triggering a third party service, the UE 301 may transmit the new service request message. As described above, the new service request message may include the tenant ID, the slice type, and a previously assigned UE ID because the third party application, tenant ID, and slice type are associated with each other.

In detail, the UE 301 transmits the new service request message to the RAN 302 at step 311, and the RAN relays the new service request message to the CCNF unit 303 at step 312.

At step 313, the CCNF unit 303 may select an NSI unit 305 suitable for the received tenant ID and slice type by means of an NSI selector NF.

At step 314, the CCNF unit 303 may relay the new service request message to the NSI unit 304.

The NSI unit 304 may establish a limited data session for authentication between the UE 301 and the third party server 307 to transmit traffic for authentication based on the new service request message. The limited data session may be a data session with a limited bandwidth and HTTP redirection.

That is, the UE 301 may need to pass an authentication process of the third party service provider in addition to the authentication process of the communication operator in order to use the NSI unit 304 leased by the third party service provider. Alternatively, if the third party service provider has not leased the NSI unit 304, the authentication process may not be performed.

In detail, the CP NF unit 305 of the NSI unit 304 may send a session creation request message to the UP NF unit 306 at step 315. The session creation request message may include a UE ID, a data session identifier (packet data unit (PDU) session ID), and a policy and charging control (PCC) rule predefined properly for the limited session.

Here, the PCC rule may include limited bandwidth and HTTP redirection information. For use in authentication of the UE 301, the data session may need to be established as a limited packet data unit session. For this purpose, the data session is limited in traffic bandwidth to a predetermined bandwidth (e.g., 64 kbps), and the HTTP redirection is configured such that all traffic is oriented to the third party server. That is, the UE 301 may only be authenticated only through the data session (PDU session).

At step 316, the UP NF unit 306 may send a session creation response message to the CP NF unit 305 in reply to the session creation request message. The session creation response message may include the UE ID and UE Internet protocol (IP) address.

At step 317, the CP NF unit 305 may transmit to the UE 301 a new service response message including information related to the limited data session in reply to the new service request message transmitted at step 314 so as to establish the limited session for authentication between the UE 301 and the third party server 307. Transmitting the new service response message to the UE 301 may include transmitting the new service response message to the UE 301 via the RAN 302.

For example, the information related to the limited data session may include a UE ID, a UE IP address, a tenant ID, a slice type, a data session identifier, and a predetermined QoS profile.

As a consequence, the limited data session may be established between the UE 301 and the third party server 307 at step 318.

If the session is established, the UE 301 (third party application 301-1 installed on the UE 301) may connect to the third party server 307 for user authentication. In this case, the user authentication may be performed in compliance with a predefined authentication scheme. For example, examples of the authentication scheme may include a credential authentication scheme, a public key/private key pair authentication scheme, a certificate authentication scheme, a private information authentication scheme, and an ID/password authentication scheme. That is, the third party server 307 may directly perform authentication on the UE based on a legacy authentication scheme.

In detail, if the limited data session is established, the third party application 301-1 may transmit, at step 319, a third party service request message as an authentication request message for authentication of the UE 301 to the third party server 307 through the limited data session. The third party service request message may include an identifier of the user of the UE 301, a password, and a network identifier (PLMN ID). User authentication may be performed between the UE 301 and the third party server 307 at step 320 based on the third party service request message.

If the user authentication succeeds, the third party server 307 may transmit a service response message as an authentication response message to the third party application 301-1 at step 321. The service response message may include a token containing a PCC rule as an update rule to be applied to the UE 301 and a temporary identifier.

At step 322, the third party server 307 may transmit to the CP NF unit 305 a service authentication server result message including the token transmitted to the UE 301.

At step 323, the UE 301 may transmit a service authentication application result method including the token to the CP NF unit 305.

The CP NF unit 305 may identify the right of the UE 301 for use of the NSI unit 304 based on the service authentication server result message received form the third party server 307 and the service authentication application result message received from the UE 301 and update the temporarily-established limited data session based on the PCC rule included in the token provided by the third party server.

In detail, if the CP NF unit 305 sends, at step 324, a message including the PCC rule for updating the data session, a data session identifier, and a UE identifier to the UP NF unit 306, and the UP NF unit 306 may update the previously established data session based on the PCC rule.

As a consequence, the updated data session is assigned between the UE 301 and the third party server 307 at step 325.

For example, if the traffic bandwidth available for the user of the UE 301 in the communication operator network during the previously established data session is 50 Mbps, it may be updated to 100 Mbps in the data session updated based on the new PCC rule.

Both the third party application 301-1 and the CP NF unit 305 may store the token received from the third party server 307.

The token may include a timer. The UE 301 may use the previously authenticated NSI unit 304 until the timer expires. In this case, any additional authentication process between the UE 301 and the third party server 307 may be omitted.

Because the PCC rule is stored in the CP NF unit 305, a new data session may be established to be appropriate for use of the third party service based on the PCC rule.

Figure 4:
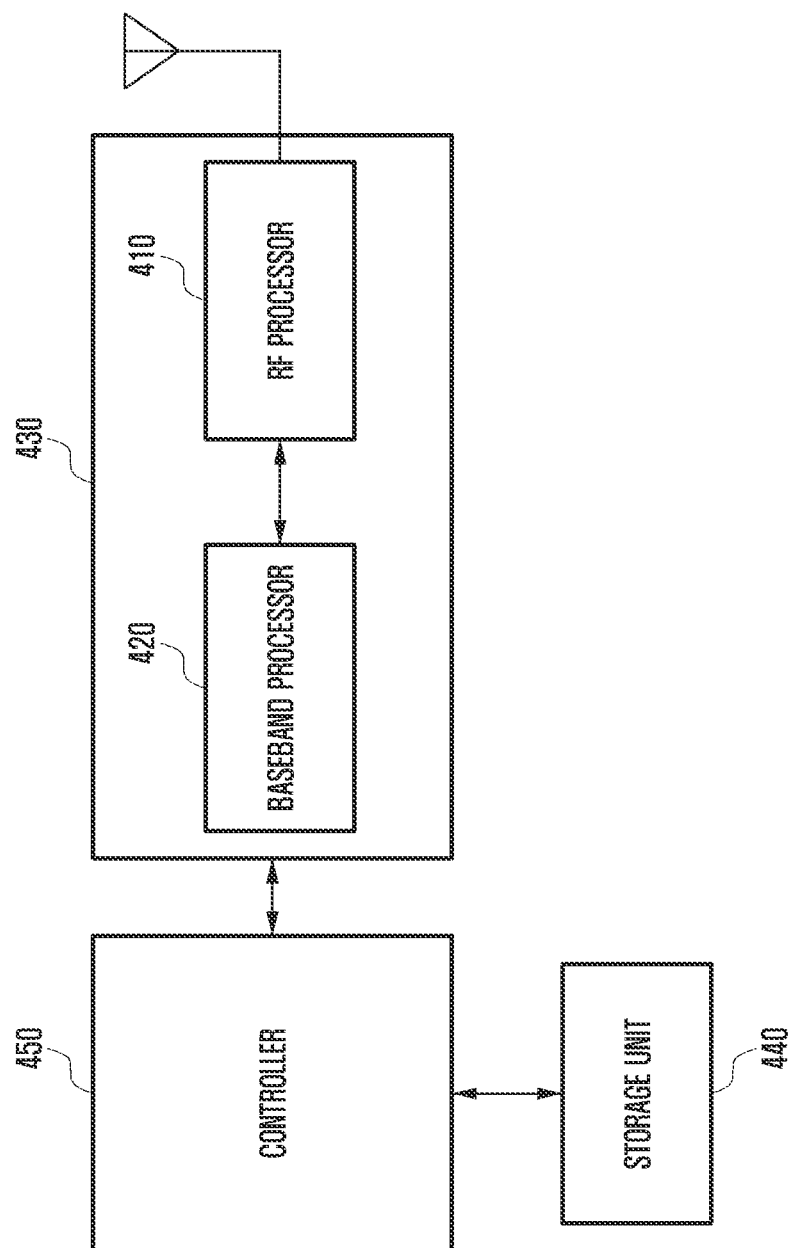
FIG. 4 is a block diagram illustrating a configuration of a UE in a wireless communication system according to an embodiment of the present invention.

FIG. 4 is a block diagram illustrating a configuration of a UE in a wireless communication system according to an embodiment of the present invention.

As shown in the drawing, the UE includes a radio frequency (RF) processor 410, a baseband processor 420, a storage unit 440, and a controller 450.

The RF processor 410 has a function for transmitting/receiving a signal over a radio channel such as band conversion and amplification of the signal. That is, the RF processing unit 410 up-converts a baseband signal from the baseband processor 420 to an RF band signal and transmits the RF signal via an antenna and down-converts the RF signal received via the antenna to a baseband signal. For example, the RF processor 410 may include a transmission filter, a reception filter, an amplifier, a mixer, an oscillator, a digital-to-analog converter (DAC), and an analog-to-digital converter (ADC). Although one antenna is depicted in the drawing, the UE may be provided with a plurality of antennas. The RF processor 410 may also include a plurality of RF chains. The RF processor 410 may perform beamforming. For beamforming, the RF processor 410 may adjust the phase and size of a signal to be transmitted/received by means of the antennas or antenna elements. The RF processor 410 may be configured to perform a MIMO operation through which the UE can receive multiple layers simultaneously. The RF processor 410 may perform a reception beam sweeping operation by properly configuring the antennas or antenna elements and adjust reception beam direction and beamwidth such that the reception beam is aligned with the corresponding transmission beam.

The baseband processor 420 has a baseband signal-bit string conversion function according to a physical layer standard of the system. For example, in a data transmission mode, the baseband processor 420 performs encoding and modulation on the transmission bit string to generate complex symbols. In a data reception mode, the baseband processor 420 performs demodulation and decoding on the baseband signal from the RF processor 410 to recover the transmitted bit string. In the case of using an OFDM scheme for data transmission, the baseband processor 420 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 420 splits the baseband signal from the RF processor 410 into OFDM symbols, perform fast Fourier transform (FFT) on the OFDM symbols to recover the signals mapped to the subcarriers, and performs demodulation and decoding on the signals to recover the transmitted bit string.

The baseband processor 420 and the RF processor 410 process the transmission and reception signals as described above. Accordingly, the baseband processor 420 and the RF processor 410 may be referred to as a transmitter, a receiver, a transceiver, or a communication unit 430. The communication unit 430 may communicate with an external node. The external node may be the NG RAN, CCNF unit, NSI unit, or third party server of the present invention by way of example; if the communication unit 430 communicates with an external node, this may include that the communication unit 430 communicates with the external node via an intermediate medium. For example, if the communication unit 430 communicates with the CCNF unit, this may include that the communication unit 430 communicates with the CCNF unit via the NG RAN. Alternatively, if the communication unit 430 communicates with the third party server, this may include that the communication unit 430 communicates with the third party server via the NG RAN and the NSI unit.

At least one of the baseband processor 420 and the RF processor 410 may include a plurality of communication modules for supporting different radio access technologies. At least one of the baseband processor 420 and the RF processor 410 may also include multiple communication modules for processing the signals in different frequency bands. For example, the different radio access technologies may include an LTE network and an NR network. The different frequency bands may include a super high frequency (SHF) band (e.g., 2.5 GHz and 5 GHz bands) and an mmWave band (e.g., 60 GHz).

The storage unit 440 may store data such as basic programs for operation of the UE, application programs, and setting information. The storage unit 440 may provide the stored data in response to a request from the controller 450. The storage unit 440 may include an internal memory and an external memory by way of example. The internal memory may include at least one of a volatile memory (e.g., DRAM, SRAM, and SDRAM), a non-volatile memory (e.g., one time programmable ROM (OTPROM)), PROM, EPROM, EEPROM, mask ROM, flash ROM, flash memory, a hard drive, and a solid state drive (SSD) by way of example. The external memory may include a flash drive such as compact flash (CF), secure digital (SD), Micro-SD, Mini-SD, extreme digital (xD), multimedia card (MMC), and memory stick. The external memory may be functionally or physically connected to the UE via various interfaces.

In the present invention, an application associated with the third party server is installed, and the storage unit 440 may store a tenant ID and a slice type in association with the application.

The controller 450 controls overall operations of the UE. For example, the controller 440 controls the communication unit 430 to transmit and receive signals. The controller 450 also writes and reads data to and from the storage unit 440. For this purpose, the controller 450 may include at least one processor. For example, the controller 450 may include a communication processor (CP) for controlling communications and an application processor (AP) for controlling higher layer programs such as applications.

According to various embodiments, the controller 450 may control the communication unit 430 to transmit a service request message including the tenant ID and slice type being provided by the application associated with the third party server to the CCNF unit. If a limited data session for authentication between the UE and the third party server is established by the NSI unit selected by the CCNF unit, the controller 450 may control the communication unit 430 to receive a service response message including information on the limited data session from the NSI unit. The controller 450 may also control the communication unit 430 to transmit an authentication request message for requesting authentication on the UE to the third party server through the limited data session based on the service response message.

According to various embodiments, the tenant ID and slice type may be stored in the UE in association with an application while the application is installed in the UE.

According to various embodiments, in the case where the controller 450 is configured to control the communication unit 430 to transmit the service request message, if the third party application is installed or executed on the UE or generates an event triggering a third party service, the controller controls the communication unit to transmit the service request message to the CCNF unit via the NG RAN.

According to various embodiments, if the UE is authenticated, the controller 450 may control the communication unit 430 to receive an authentication response message including a token from the third party server.

According to various embodiments, the controller 450 may control the communication unit 430 to transmit a service authentication result message including the token to the NSI unit and forward the traffic of the application to the third party server through the data session updated based on the service authentication result message.

According to various embodiments, at least one of the tenant ID and the slice type may be determined based on the network identifier (PLMN ID) of the communication operator subscribed to by the UE.

Figure 5:
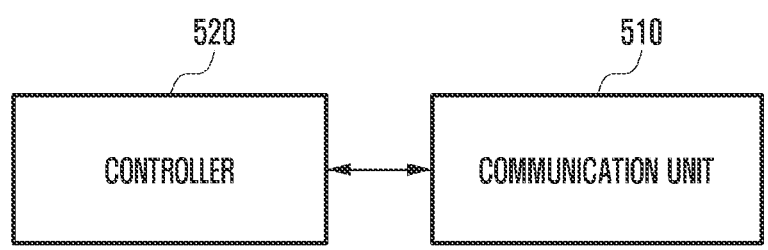
FIG. 5 is a block diagram illustrating a configuration of an NSI unit of a wireless communication system according to an embodiment of the present invention.

FIG. 5 is a block diagram illustrating a configuration of an NSI unit of a wireless communication system according to an embodiment of the present invention.

As shown in the drawing, the NSI unit includes a communication unit 510 and a controller 520.

The communication unit 510 may communicate with an external node. The external node may be the NG RAN, CCNF unit, NSI unit, or third party server of the present invention by way of example; if the communication unit 510 communicates with an external node, this may include that the communication unit 430 communicates with the external node via an intermediate medium. For example, if the communication unit 510 communicates with a UE, this may include that the communication unit 510 communicates with the UE via an NG RAN.

A storage unit (not shown) stores data such as basic programs for operation of the NSI unit, application programs, and setting information. The storage unit (not shown) may provide the stored data in response to a request from the controller 520. The storage unit (not shown) may include an internal memory and an external memory by way of example. The internal memory may include at least one of a volatile memory (e.g., DRAM, SRAM, and SDRAM), a non-volatile memory (e.g., one time programmable ROM (OTPROM)), PROM, EPROM, EEPROM, mask ROM, flash ROM, flash memory, a hard drive, and a solid state drive (SSD) by way of example. The external memory may include a flash drive such as compact flash (CF), secure digital (SD), Micro-SD, Mini-SD, extreme digital (xD), multimedia card (MMC), and memory stick. The external memory may be functionally or physically connected to the NSI unit via various interfaces.

The controller 520 controls overall operations of the NSI unit. For example, the controller 520 controls the communication unit 510 to transmit and receive signals. The controller 520 also writes and reads data to and from the storage unit (not shown). For this purpose, the controller 520 may include at least one processor. For example, the controller 520 may include a communication processor (CP) for controlling communications and an application processor (AP) for controlling higher layer programs such as applications.

According to various embodiments, the controller 520 may control the communication unit 510 to receive a service request message from the UE. The controller 520 may establish a limited data session for authentication between the UE and the third party server based on the received service request message. The controller 520 may also control the communication unit 510 to transmit a service response message including information on the limited data session to the UE for assigning the limited data session.

According to various embodiments, if the authentication is achieved between the UE and the third party server through the limited data session, the controller 520 may control the communication unit 510 to receive a service authentication result message including an update rule from the third party server. The controller 520 may also establish an updated data session based on the update rule.

According to various embodiments, if the controller is configured to control the communication unit 510 to receive a service request message from the UE in the wireless communication system, it may control the communication unit 510 to receive the service request message from the UE via a CCNF unit selected by the NSI.

According to various embodiments, if the controller 520 is configured to establish a session for authentication between the UE and the third party server, it may control the CP NF unit to send a session creation request message to a UP NF unit based on the service request message. The controller 520 may also control the UP NF unit to send a session creation response message to the CP NF unit in reply to the session creation request message.

Figure 6:
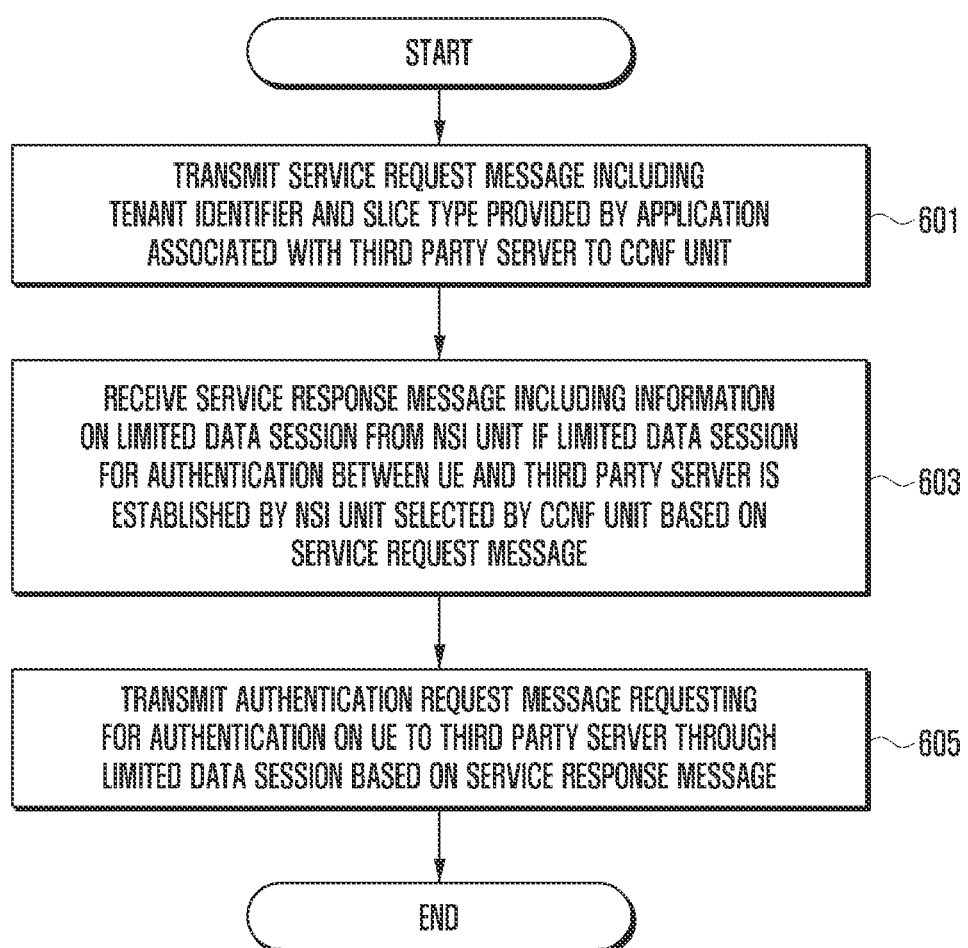
FIG. 6 is a flowchart illustrating a procedure for a UE to request to a third party server for authentication in a wireless communication system according to an embodiment of the present invention.

FIG. 6 is a flowchart illustrating a procedure for a UE to request to a third party server for authentication in a wireless communication system according to an embodiment of the present invention.

At step 601, the UE may first transmit to a CCNF unit a service request message including a tenant ID and a slice type provided by an application associated with the third party server.

Here, the tenant ID and slice type may be stored in the UE in association with the application while the application is being installed on the UE. At least one of the tenant ID and the slice type may be determined based on a network ID (PLMN ID) of the communication operator previously subscribed to by the UE.

In the case of being configured to transmit the service request message, the UE may transmit the service request message to a CCNF unit via a GN RAN, if the third party application is installed or executed on the UE or generates an event triggering a third party service.

If a limited data session for authentication between the UE and the third party server is established by the NSI unit selected by the CCNF unit, the UE may receive a service response message including information on the limited data session from the NSI unit at step 603.

Next, the UE may transmit an authentication request message for authentication on the UE to the third party server, at step 605, through the limited data session based on the service response message.

If the UE is authenticated, it may receive an authentication response message including a token from the third party server.

Next, the UE may transmit a service authentication result message including the token to the NSI unit. Then, the UE may transmit traffic of the application to the third party server via the data session updated based on the service authentication result message.

Figure 7:
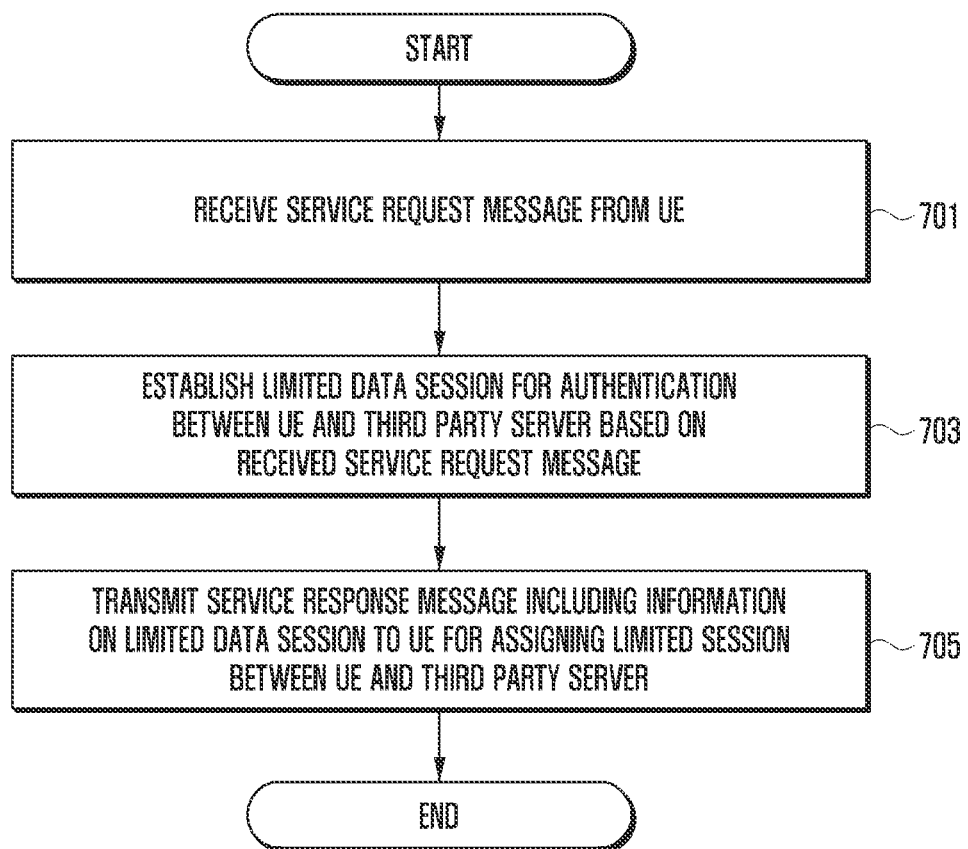
FIG. 7 is a flowchart illustrating a procedure for an NSI unit to establish a data session in a wireless communication according to an embodiment of the present invention.

FIG. 7 is a flowchart illustrating a procedure for an NSI unit to establish a data session in a wireless communication according to an embodiment of the present invention.

At step 701, the NSI unit may first receive a service request message from a UE. In this case, the NSI unit may receive the service request message from the UE via a CCNF that has selected the NSI.

Next, the NSI unit may establish a limited data session for authentication between the UE and the third party server at step 703.

For example, a CP NF unit of the NSI unit may send a session creation request message to a UP NF unit of the NSI unit based on the service request message. In response to the session creation request message, the UP NF unit may send the CP NF unit a session creation response message including information on the established data session.

Next, the NSI unit may transmit a service response message including the information on the limited data session to the UE, at step 705, for assigning the limited data session between the UE and the third party server.

If the authentication is achieved between the UE and the third party server through the limited data session, the NSI unit may receive a service authentication result message including an update rule from the third party server. The NSI unit may establish a data session updated based on the updated rule.

As a consequence, the UE may transmit traffic of the application to the third party server through the updated data session.

According to an embodiment of the present invention, at least part of the components (e.g. modules or their functions) of the wireless communication system or methods (e.g., operations) may be implemented in the form of program modules stored in a non-transitory computer-readable storage medium. In the case that the instructions are executed by a processor, the processor may execute the functions corresponding to the instructions.

Here, a program may be stored in a non-transitory computer-readable storage medium and read and executed by a computer according to an embodiment of the present invention.

Here, non-transitory storage media may include volatile and non-volatile memories storing data temporarily for operation or transmission such as a resistor, a cache, and a buffer as well as media storing data readable by a device semi-persistently. However, temporary transmission media such as signals and current are not included in the non-transitory storage media.

In detail, the above described programs may be provided in the state of being stored in a non-transitory computer-readable storage medium such as CD, DVD, hard disk, blu-ray disk, USB, internal memory of the device of the present invention, memory card, ROM, and RAM.

The above-described programs may also be stored in a memory of a server and transmitted to a terminal (e.g., device of the present invention) connected to server through a network for sale or transferred or registered to the server by a program provider (e.g., program developer and program producer).

In the case where the above-described programs are transmitted from a server to a terminal for sale, at least part of the programs may be loaded on a buffer of the server temporarily before being transmitted. In this case, the buffer of the server may be the non-transitory storage medium.

According to an embodiment, the non-transitory computer-readable storage medium may store a program being executed by a terminal, which transmits a service request message including a tenant ID and a slice type provided by the application associated with the third party server to a CCNF unit, receives, if a limited data session is established by an NSI unit selected by the CCNF unit for authentication between the terminal and the third party server based on the service request message, a service response message including information on the limited data session from the NSI unit, and transmit an authentication request message for authenticating the terminal to the third party server through the limited data session based on the service response message.

According to an embodiment, the non-transitory computer-readable storage medium may store a program being executed by an NSI unit, which receives a service request message from a terminal, establishes a limited data session for authentication between the terminal and a third party server based on the received service request message, and transmits a service response message including information on the limited data session to the terminal to assign the limited data session between the terminal and the third party server.

Although the description has been made with reference to particular embodiments, the present invention can be implemented with various modifications without departing from the scope of the present invention. Thus, the present invention is not limited to the particular embodiments disclosed and will include the following claims and their equivalents.

The invention claimed is:

1. A method for a user equipment (UE), the method comprising:
    transmitting, to a network function associated with mobility management, a first message including information related to a network slice; and receiving, from the network function associated with mobility management, a third message including a result of an authentication for the network slice, wherein whether or not to require the authentication is determined by the network function associated with mobility management based on subscription information, and wherein the authentication for the network slice with a server is triggered in case that the authentication is determined to be required.

2. The method of claim 1, wherein the information related to the network slice includes at least one of tenant information and a slice type, and wherein the server includes an authentication server.

3. The method of claim 1, wherein the authentication is performed based on credentials.

4. The method of claim 1, wherein whether to skip additional authentication is determined depending on the result of the authentication.

5. A method for a network function associated with mobility management, the method comprising:

receiving, from a user equipment (UE), a first message including information related to a network slice;

determining whether an authentication for the network slice is required or not based on subscription information;

triggering the authentication for the network slice with a server based on the determination;

receiving, from the server, a second message including a result of the authentication; and transmitting, to the UE, a third message including the result of the authentication.

6. The method of claim 5, wherein the information related to the network slice includes at least one of tenant information and a slice type, and wherein the server includes an authentication server.

7. The method of claim 5, wherein the authentication is performed based on credentials.

8. The method of claim 5, further comprising:

determining whether to skip additional authentication depending on the result of the authentication.

9. A user equipment (UE), the UE comprising:

a transceiver; and at least one processor configured to control the transceiver to:

transmit, to a network function associated with mobility management, a first message including information related to a network slice, and receive, from the network function associated with mobility management, a third message including a result of an authentication for the network slice, wherein a first authentication of the UE has been performed, wherein whether or not to require the authentication is determined by the network function associated with mobility management based on subscription information, and wherein the authentication for the network slice with a server is triggered in case that the authentication is determined to be required.

10. The UE of claim 9, wherein the information related to the network slice includes at least one of tenant information and a slice type, and wherein the server includes an authentication server.

11. The UE of claim 9, wherein the authentication is performed based on credentials.

12. The UE of claim 9, wherein whether to skip additional authentication is determined depending on the result of the authentication.

13. A network function associated with mobility management, the network function associated with mobility management comprising:

a transceiver; and at least one processor configured to control the transceiver to:

receive, from a user equipment (UE), a first message including information related to a network slice, determine whether an authentication for the network slice is required or not based on subscription information, trigger the authentication for the network slice with a server based on the determination, receive, from the server, a second message including a result of the authentication, and transmit, to the UE, a third message including the result of the authentication.

14. The network function associated with mobility management of claim 13, wherein the information related to the network slice includes at least one of tenant information and a slice type, wherein the authentication is performed based on credentials, and wherein the server includes an authentication server.

15. The network function associated with mobility management of claim 13, wherein the at least one processor is configured to determine whether to skip additional authentication depending on the result of the authentication.

* * * * *